United States Patent [19]

Gibson et al.

[11] Patent Number: 5,316,191
[45] Date of Patent: May 31, 1994

[54] TIRE CHAIN HANGER SUPPORT ASSEMBLY

[76] Inventors: C. Norman Gibson, 7080 York St., Denver, Colo. 80229; O. Dean Gibson, Rte. 2, Box 151, Wakeeney, Kans. 67672

[21] Appl. No.: 866,557

[22] Filed: Apr. 10, 1992

[51] Int. Cl.$^5$ .............................................. B60R 7/00
[52] U.S. Cl. .................... 224/42.45 R; 224/42.031; 224/42.042; 224/42.035; 280/851
[58] Field of Search ................. 224/42.45 R, 42.31, 224/42.32, 42.42, 42.43, 42.41, 42.34, 42.35, 42.03 R, 281; 280/851, 848; 403/109, 112, 377, 378, 108, 328, 325, 327

[56] References Cited

U.S. PATENT DOCUMENTS

| | | | |
|---|---|---|---|
| 649,444 | 5/1900 | Good | 403/108 |
| 956,696 | 5/1910 | Frost | 248/298 |
| 1,482,770 | 2/1924 | Terrell | 224/42.45 R |
| 2,935,336 | 5/1960 | Case | 280/851 |
| 3,039,634 | 6/1962 | Hobson et al. | 224/42.03 R |
| 4,180,230 | 12/1979 | Sogoian | 280/851 |
| 4,369,902 | 1/1983 | Lampeas | 224/42.42 |
| 4,726,599 | 2/1988 | Antekeier et al. | 280/851 |
| 5,096,102 | 3/1992 | Tolson | 224/424.5 R |

Primary Examiner—Henry J. Recla
Assistant Examiner—David J. Walczak
Attorney, Agent, or Firm—Phillip A. Rein

[57] ABSTRACT

A tire chain hanger support assembly connectable to a support frame of a vehicle and having 1) a main support frame assembly secured to the support frame; 2) a chain support frame assembly telescopingly mounted on the main support frame assembly; 3) a telescoping control assembly to limit axial outer lateral movement of the chain support frame assembly; and 4) a mud flap support assembly connected to the chain support frame assembly. The chain support frame assembly is selectively operable to be moved outwardly laterally of the support frame and includes a chain support assembly to receive and convey tire chains. The chain support assembly is movable to a stored condition and held in a locked condition by the telescoping control assembly. The mud flap assembly includes a forward flap assembly connected to the chain support frame assembly and a rear flap assembly operable to be connected to the support frame. The mud flap assembly provides protection to the stored tire chains from mud, snow, and debris from rotating vehicle tire members.

6 Claims, 3 Drawing Sheets

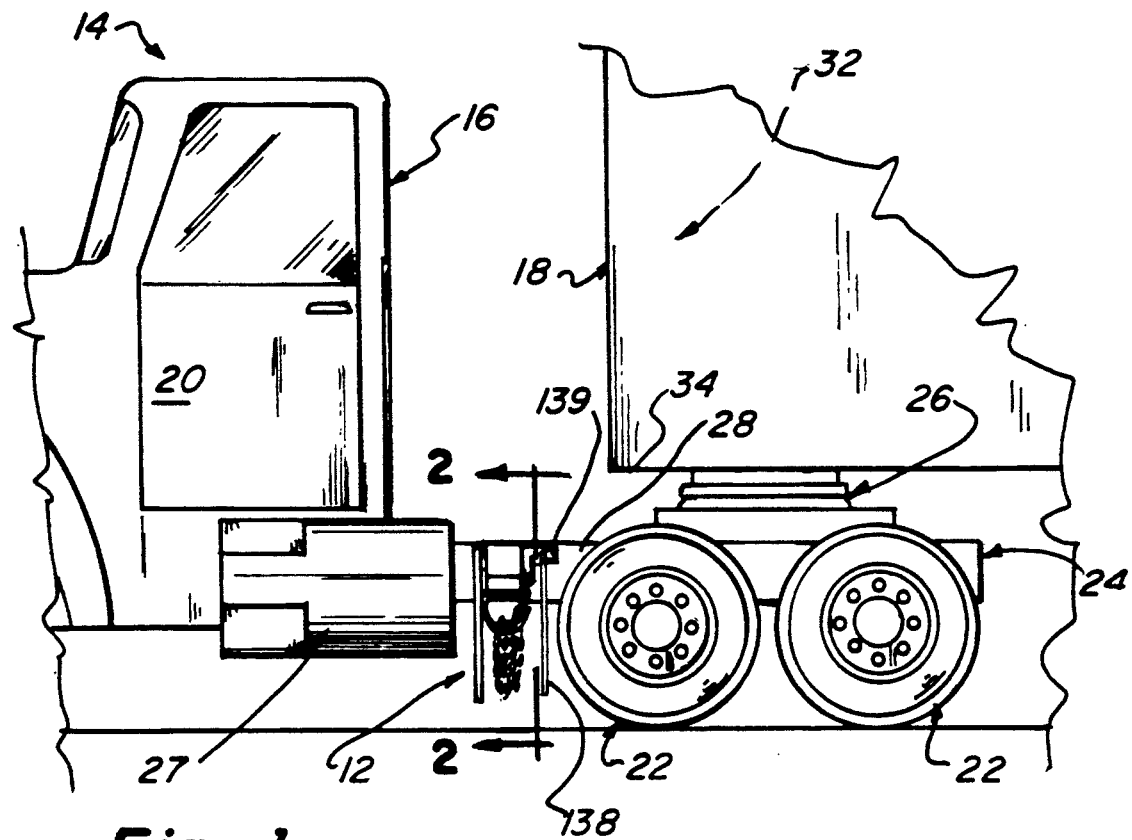
Fig_1
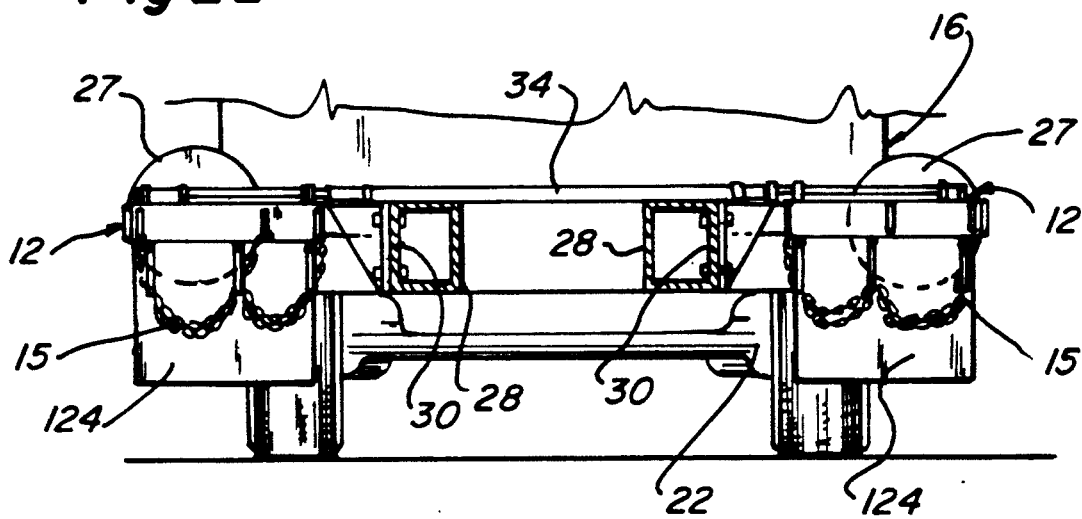
Fig_2

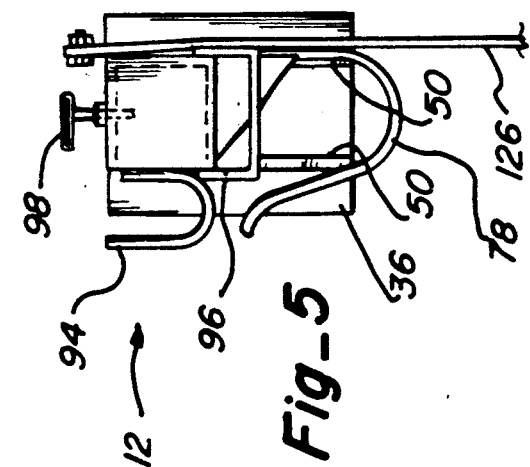
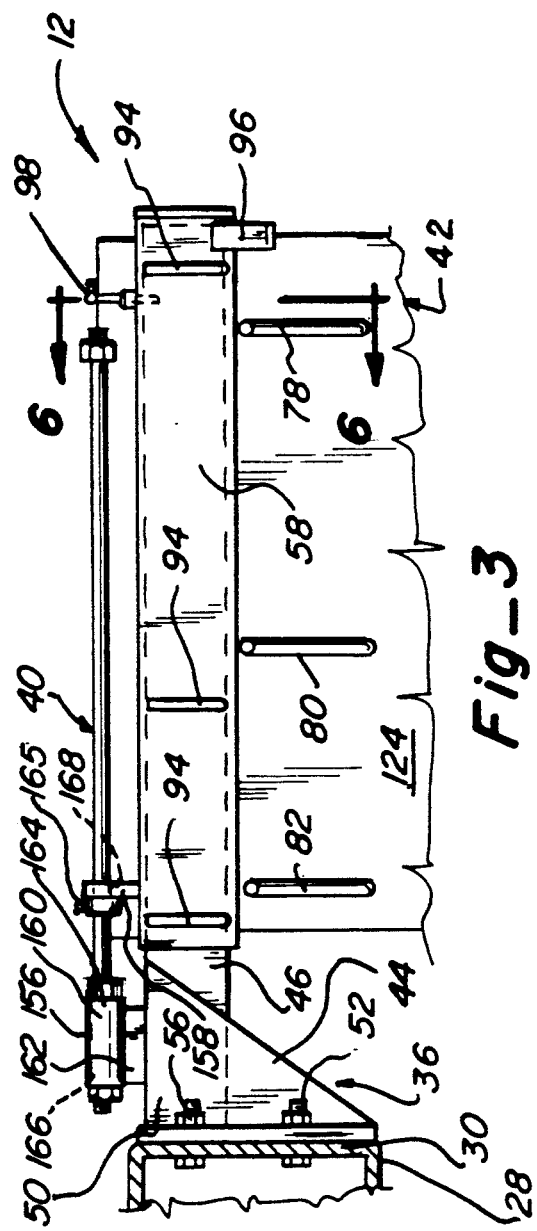
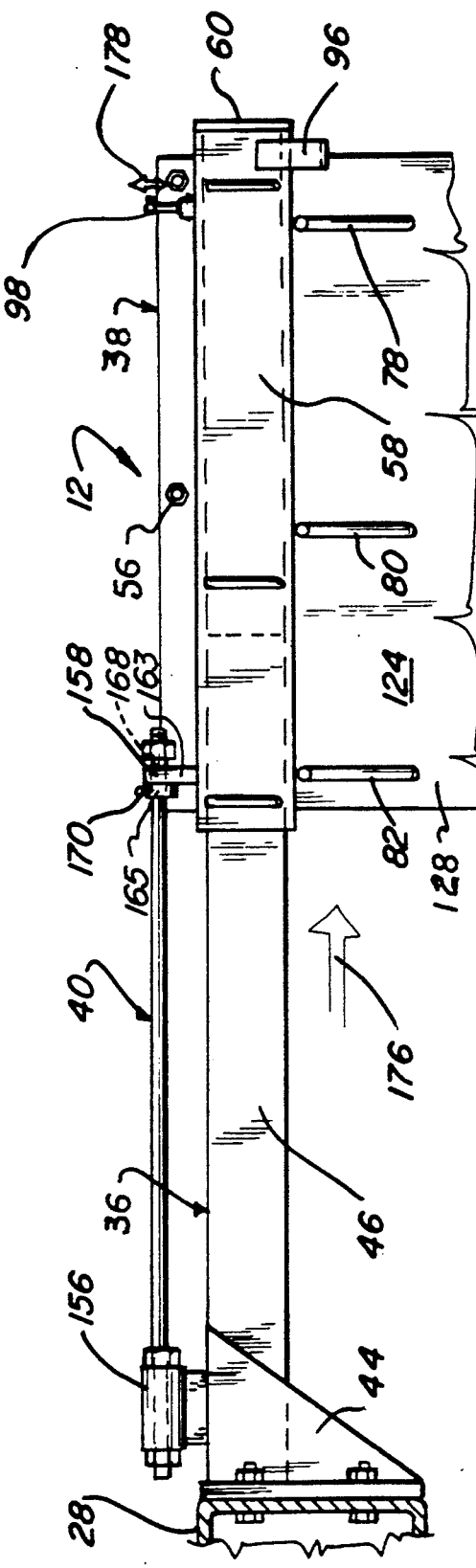

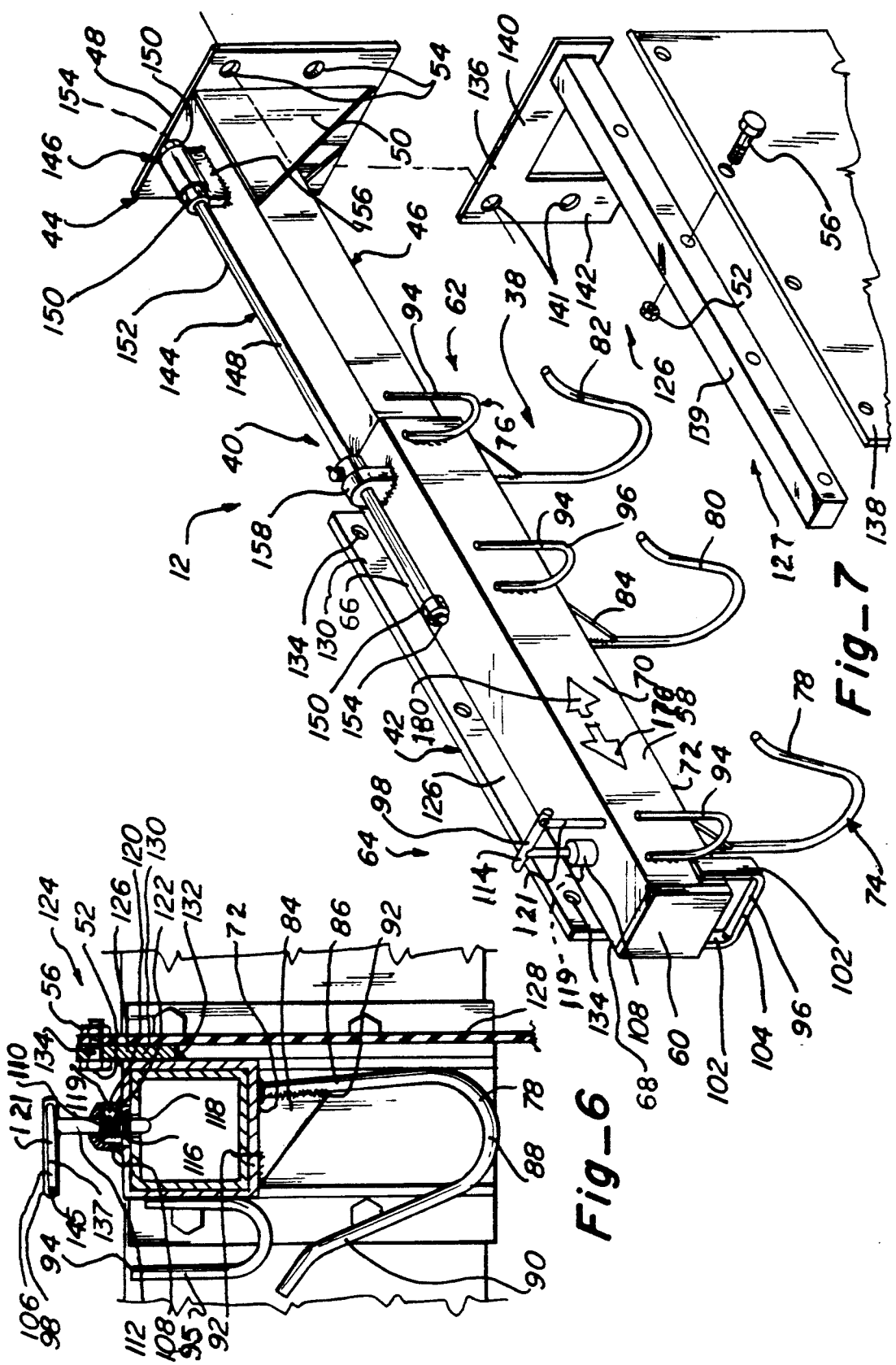

TIRE CHAIN HANGER SUPPORT ASSEMBLY

PRIOR ART

A patent search on this invention revealed the following United States patents:

| U.S. Pat. No. | Invention | Inventor |
|---|---|---|
| 1,780,834 | CHAIN CARRIER AND PULL | James R. Moore |
| 2,819,683 | MEAT TRUCK AND TRACK SYSTEM THEREFOR | Sidney Le Fiell |
| 3,039,634 | AUTOMOBILE CARRIER FOR OUTBOARD MOTOR | Hobson et al |
| 3,158,302 | UTILITY CARRIER | James O. Dickerson |
| 3,294,267 | SADDLE CARRIERS | Johnny P. Schweigert |
| 4,418,853 | PALLET CARRIER | James D. Shaffer |
| 4,564,134 | PALLET STORAGE RACK | Charles Seibert |
| 4,878,605 | LOAD CARRYING APPARATUS | Doyle et al |
| 4,966,401 | EXTENSION GUIDE SYSTEM FOR MOUNTING TRUCK STORAGE BOX | Dutro et al |

The Moore patent discloses a tire chain carrier mounted underneath a running board on an automobile.

The Le Fiell patent discloses a system utilizing a plurality of hooks being mounted within a cargo area in a semi-trailer truck.

The Hobson et al and Dickerson patents disclose carriers for attachment to an under-surface or frame of an automobile for carrying an outboard motor, luggage, or the like. The Dickerson patent teaches the use of telescoping members but this structure is removed when not being used and not movable for storage underneath a frame structure.

The Schweigert patent teaches saddle carriers mounted within a front compartment on a horse trailer.

The Shaffer, Seibert, and Doyle et al patents are related to structures connected to an under-surface of a semi-trailer for the purpose of storing and conveying pallet members.

The Dutro et al patent discloses a tool box glide system to support a tool box which is movable from underneath a truck bed to a lateral position so a tool box lid can be opened.

PREFERRED EMBODIMENT OF THE INVENTION

In one preferred embodiment of this invention, a tire chain hanger support assembly is provided mounting on a tractor trailer combination in order to receive, convey, and store tire chains thereon. A pair of tire chain hanger support assemblies may be used being anchored on common central or parallel support beam members of a support frame assembly of a tractor assembly of the tractor trailer combination so that the capacity for holding tire chains is doubled with access thereto from either side of the tractor assembly.

Each tire chain hanger support assembly includes 1) a main support frame assembly anchored to the support frame assembly on the tractor assembly; 2) a chain support frame assembly telescopingly mounted on the main support frame assembly; 3) a telescoping control assembly interconnected to both the main support frame assembly and the chain support frame assembly to limit telescoping movement therebetween; and 4) a mud flap support assembly secured to the chain support frame assembly and to a portion of the support frame assembly of the tractor assembly. The mup flap support assembly operates to prevent mud, water, and the like from covering the tire chains and, additionally, protect the tire chains from hitting a portion of the tractor assembly during transporting such as a fuel storage tank or the like.

The main support frame assembly includes 1) a support bracket assembly which is securely mounted on a beam frame member on the support frame assembly of the tractor assembly; and 2) a support beam member which is secured and extended perpendicular to the beam frame member.

The support bracket assembly includes a base support plate having anchored gusset plates for rigidity connected thereto and having the base support plate secured as by anchor members to the support assembly.

The chain support frame assembly includes 1) a chain support beam member telescopingly mounted on the support beam member; 2) an end plate member secured to an outer end of the chain support beam member so as to enclose same and add rigidity; 3) a chain support assembly secured to the chain support beam member; and 4) an actuator control assembly operable to secure the chain support beam member when in the retracted position to anchor during movement of the tractor trailer combination.

The chain support assembly includes primary support members and secondary support members positioned in cooperating relationship to each other and operable to receive and support portions of the tire chains thereon.

The primary support members includes primary hook members of generally "U" shape which are secured through gusset plate members to a bottom wall of the chain support beam member.

The secondary support members include "U" shaped hook members with respective ones positioned relative to a respective one of the primary hook members for controlled hanging of the tire chains thereon so as to be easily placed on and removed from the chain support assembly.

The actuator control assembly includes 1) a handle member secured to an outer portion of the chain support beam member to aid in axial telescoping movement thereof; and 2) a lock pin assembly connected to an outer end of the chain support beam member and operable to be selectively anchored to the support beam member when in the retracted transport position.

The lock pin assembly includes a pin member of "T" shape mounted within a restraining cap member and utilizing a bias member to hold in the locked position for safety purposes. A support latch bar is connected to the pin member to hold in a released position so that the pin member does not engage the support beam member and the chain support beam member can then be readily moved longitudinally thereof. This allows for the lock pin assembly to be positioned in the unlatched condition so that a single operator can then use both hands to remove the chains from the chain support assembly or use both hands to move the chain support beam member inwardly to the retracted position which may be quite heavy when loaded with numerous chain members thereon.

The telescoping control assembly includes a limit rod assembly which is connected by a rod support assembly to respective portions of the support beam member and the chain support beam member. The limit rod assembly includes a main rod member having outer threaded end portions and anchor nut members mounted on the threaded end portions.

The rod support assembly includes a stationary rod support assembly and a movable rod support assembly. The stationary rod support assembly includes a support housing having a central opening to receive one end of the main rod member therein and secured through a support block member to an upper surface of the support beam member adjacent the support bracket assembly of the main support frame assembly.

A pair of anchor nut members are secured to the main rod member on opposite sides of the support housing member to hold in a selected anchored position.

The movable rod support assembly includes a rod support member connected to a bearing member. The bearing member receives a portion of the main rod member therethrough for vertical support when engaging in telescoping movement of the chain support beam member.

The outer threaded end of the main rod member has an anchor nut member thereon which will contact the rod support member of the movable rod support assembly in the fully outward telescoped position so as to limit and control its outermost position.

The mud flap support assembly includes 1) a forward flap assembly interconnected to the chain support frame assembly to prevent mud and other debris from being deposited on the chain members on the chain support assembly; and 2) a rear flap assembly secured to the beam frame member of the support frame assembly to protect the tire chains from mud and debris from adjacent rotating tires positioned rearwardly thereof.

The forward flap assembly includes a flap support plate anchored to a forward top edge of the chain support beam member and having a primary flap member connected thereto and depending downwardly therefrom.

The rear flap assembly includes a flap support bracket which is secured by anchor members to the beam frame member and having a second flap member secured thereto and depending downwardly therefrom.

OBJECTS OF THE INVENTION

One object of this invention is to provide a tire chain hanger support assembly which can be easily secured to a support frame assembly on a tractor trailer combination and having a chain support frame assembly telescopingly mounted on a support beam member so that the chain support frame assembly can be moved from a compact storage position outwardly therefrom to an access position to provide easy access to tire chains when needed due to weather conditions.

Another object of this invention is to provide a pair of tire chain hanger support assemblies, respective ones mounted on each side of parallel box beam members on an underside of a tractor assembly and each having a telescoping chain support frame assembly thereon with a chain support assembly to receive, store, and hold tire chains thereon.

One other object of this invention is to provide a tire chain hanger support assembly including 1) a main support frame assembly with an anchored support beam member; and 2) a chain support assembly having a chain support beam member telescopingly mounted on the support beam member so as to be moved from an anchored, retracted position to an outward access position laterally of a cargo area of a semi-trailer assembly so as to be readily accessible by a tractor trailer combination operator to remove or place tire chains.

One further object of this invention is to provide a tire chain hanger support assembly including a stationary support beam member with a chain support frame assembly mounted thereon and having a mud flap support assembly with a flap member positioned forwardly and rearwardly of the chain support frame assembly to prevent mud, water, and other debris from being directed onto the tire chains.

Another object of this invention is to provide a tire chain hanger support assembly including 1) a main support frame assembly with an anchored support beam member; 2) a chain support frame assembly having a chain support beam member telescopingly mounted on the support beam member; 3) a telescoping control assembly interconnected between the support beam member and the chain support beam member operable to limit telescoping movement of the chain support beam member; and 4) an actuator control assembly to lock the chain support beam member to the support beam member in a retracted transport condition.

Another further object of this invention is to provide a tire chain hanger support assembly which includes a main support frame assembly and a chain support beam member mounted thereon which can be readily removed therefrom during warm weather conditions when not needed to carry the tire chains thereon.

Still, one other object of this invention is to provide a tire chain hanger support assembly which is rigid in construction; economical to manufacture., easy to use and operate by a single operator; providing numerous chain support members necessary to hold a plurality of tire chains thereon; utilizes unused space on a tractor trailer combination for storage; provided with safety features for holding in a retracted transport position; providing flap members thereon to protect the tire chains during storage and transport; and is substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a fragmentary side elevational view of a tractor trailer combination having a tire chain hanger support assembly of this invention mounted thereon;

FIG. 2 is a fragmentary sectional view taken along line 2—2 in FIG. 1 illustrating two (2) of the tire chain hanger support assemblies mounted thereon;

FIG. 3 is an elevational view of the tire chain hanger support assembly as mounted on a passenger side of the tractor trailer combination as noted in FIG. 2;

FIG. 4 is a fragmentary elevational view as noted in FIG. 3 illustrating the tire chain hanger support assembly in a telescoping extended position for adding and removing tire chains therefrom;

FIG. 5 is an end elevational view of the tire chain hanger support assembly;

FIG. 6 is an enlarged sectional view taken along line 6—6 in FIG. 3; and

FIG. 7 is a perspective view illustrating the use and operation of the tire chain hanger support assembly of this invention.

The following is a discussion and description of preferred specific embodiments of the tire chain hanger support assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, a tire chain hanger support assembly, indicated generally at 12, is mounted on a tractor trailer combination 14 to hold to hold tire chains 15 thereon. In fact, a pair of the tire chain hanger support assemblies 12 can be utilized to double the capacity for carrying the tire chains 15 which is noted by the elevational view in FIG. 2.

The tractor trailer combination 14 is of a conventional nature having a tractor assembly 16 connectable to a semi-trailer assembly 18 used to carry cargo. The semi-trailer assembly 18 includes an enclosed cargo area 32 and having a bottom support trailer floor 34.

The tractor assembly 16 includes 1) a cab member 20; 2) a plurality of spaced wheel and axle assemblies 22 connected on both the cab member 20 and the semi-trailer assembly 18; 3) a support frame assembly 24 secured to the cab member 20; 4) a fifth wheel assembly 26 secured on the support frame assembly 24 and operable to be connected to the semi-trailer assembly 18 in a conventional manner; and 5) a pair of fuel storage tanks 27 mounted on opposite sides of the cab member 20 for conveyance of diesel fuel or the like.

The support frame assembly 24 includes a pair of spaced parallel box beam frame members 28 of square shape in transverse cross section and having outer upright side walls 30 to which respective ones of the tire chain hanger support assemblies 12 are connected thereto.

As each tire chain hanger support assembly 12 is substantially identical in structure except having a portion thereof mounted in a reverse direction, only one need be described in detail.

Each tire chain hanger support assembly 12 includes 1) a main support frame assembly 36 operable to be connected to the outer upright side wall 30 of a respective one of the box beam frame members 28; 2) a chain support frame assembly 38 telescopingly mounted on the main support frame assembly 36; 3) a telescoping control assembly 40 interconnected between the chain support frame assembly 38 and the main support frame assembly 36 to limit relative axial movement therebetween; and 4) a mud flap support assembly 42 having a first portion connected to the chain support frame assembly 38 and a second portion connected to a respective one of the box beam frame members 28 as will be explained.

The main support frame assembly 36 includes 1) a support bracket assembly 44 secured to the outer upright side wall 30 of the support frame assembly 24; and 2) a support beam member 46 preferably of square shape in transverse cross section with one end thereof secured to the support bracket assembly 44.

The support bracket assembly 44 includes a vertically extended base support plate 48 having anchor gusset plates 50 secured thereto for rigidity and anchor members 52 to secure the base support plate member 48 to a respective one of the parallel box beam frame members 28. The base support plate 48 has a plurality, namely four, spaced anchor holes 54 to receive the anchor members 52 being nut and bolt members 56 therethrough.

The support bracket assembly 44 is of a rigid construction which is necessary to provide sufficient support to the laterally extended support beam member 46 and the chain support frame assembly 38 connected thereto.

The chain support frame assembly 38 includes 1) a chain support beam member 58 telescopingly mounted on the support beam member 46; 2) an end plate member 60 secured to an outer end of the chain support beam member 58; 3) a chain support assembly 62 secured to the chain support beam member 58; and 4) an actuator control assembly 64 connected to an outer end of the chain support beam member 58.

The chain support beam member 58 is preferably of a square shape in transverse cross section having a top wall 66 integral with spaced parallel side walls 68, 70 and a bottom wall 72 integral with the side walls 68, 70.

The chain support assembly 62 includes a primary support assembly 74 and a secondary support assembly 76 utilized in cooperation with the primary support assembly 74.

The primary support assembly 74 include a plurality of spaced hook members 78, 80, 82, each having a gusset plate member 84 of triangular shape secured and associated therewith. Each of the primary hook members 78, 80, 82 include an anchor leg portion 86 integral with an arcuate curved portion 88 which, in turn, is integral with a curved chain receiving portion 90.

The respective ones of the gusset plate members 84 include leg sections 92 which are secured as by welding to the bottom wall 72 of the chain support beam member 58 and the anchor leg portion 86 of respective ones of the primary hook members 78, 80, 82.

The secondary support assembly 76 includes a "U" shaped hook member 94 associated with respective ones of the primary hook members 78, 80, 82. Each hook member 94 has an outer leg portion 95 extended vertically and operable to receive ends of the respective tire chains 15 thereon for supporting and restraining during transport operations.

The actuator control assembly 64 includes 1) a handle member 96 secured to an outer portion of the chain support beam member 58; and 2) a lock pin assembly 98 secured to and mounted on an outer portion of the chain support beam member 58 and selectively engagable with a hole in an outer end of the support beam member 46 to anchor in the non-telescoping or retracted transport position as will be explained.

The handle member 96 is of a generally "U" shape having parallel leg sections 102 integral with a mid section 104 therebetween. The mid section 104 is operable to be grasped by a vehicle operator using the tire chain hanger support assembly 12 for ease of moving the chain support beam member 58 to an outer extended position as noted in FIG. 4. The handle member 96 is also grasped for moving the chain support beam member 58 to the retracted position as noted in FIG. 3.

The lock pin assembly 98 includes 1) a pin member 106 of generally "T" shape; 2) a restraining cap member 108 to receive the pin member 106 therethrough; and 3) a bias member 110 being a compression spring 122 to bias the pin member 106 into an anchored or locked position.

The pin member 106 includes a body section 112 with a handle section 114 secured and extended perpendicular to the body section 112 as best noted in FIG. 6. The body section 112 includes a shoulder portion 116 and a lower anchor portion 118 which is operable to be positioned through aligned holes 119 in the top wall 66 of the chain support beam member 58 and a top wall of the support beam member 46 when in the retracted, anchored position as noted in FIG. 3.

The restraining cap member 108 is of a cup shape having a spring opening 120 therein and a hole in the top portion to receive the pin member 106 therethrough.

The restraining cap member 108 is operable to receive the bias member 110 therein with a lower end of the bias member 110 resting on a top portion of the shoulder portion 116. A lower surface of the shoulder portion 116 is operable to engage a top surface of the support beam member 46 about the hole 119 to limit downward movement of the pin member 106 and hold in the locked position as noted in FIG. 6.

As noted in FIG. 6, the lock pin assembly 98 includes a support latch bar 121 which is pivotal downwardly from the handle section 114 to a position parallel with the body section 112 and having a lower end portion engagable with the top wall 66 of the chain support beam member 58. This is to hold the pin member 106 in an upward retracted position to move the anchor portion 118 out of engagement with the alignment hole 119 in the support beam member 46. This allows the operator of the tire chain hanger support assembly 12 to then grasp the handle member 96 for moving the chain support frame assembly 38 from the extended to the retracted positions without the necessity of having one hand on the lock pin assembly 98.

As noted collectively in FIGS. 3 and 7, the telescoping control assembly 40 includes a limit rod assembly 144 interconnected by a rod support assembly 146 to the support beam member 46 and the chain support beam member 58. The limit rod assembly 144 includes a main rod member 148 having anchor nut members 150 secured to opposite ends thereof.

More specifically, the main rod member 148 has a central portion 152 with integral threaded end portions 154 on opposite ends thereof. The threaded end portions 154 have the anchor nut members 150 adjustably mounted thereon to regulate and control telescoping and axial movement of the chain support beam member 58.

The rod support assembly 146 includes 1) a stationary rod support assembly 156 secured to an upper wall of the support beam member 46 adjacent the support bracket assembly 44; and 2) a movable rod support assembly 158 secured to the top wall 66 adjacent an inner end thereof of the chain support beam member 58.

The stationary rod support assembly 156 includes a support housing member 160 with a support block member 162 secured thereto. The support housing member 160 includes a cylindrical body member 164 having a central opening 166 thereon to receive the main rod member 148 therethrough. One of the anchor nut members 150 is mounted on the threaded end portion 154 of the main rod member 148 on each side of the cylindrical body member 164 to form a rigid connection as noted in FIG. 7.

The support block member 162 is of generally rectangular shape and secured as by welding to the top wall section of the support beam member 46.

The movable rod support assembly 158 includes a rod support member 163 having a bearing member 165 connected thereto. The rod support member 163 has a central rod opening 168 to receive the main rod member 148 therethrough. The bearing member 165 is provided with a zerk member 170 for periodic lubrication thereof.

An outer end of the main rod member 148 having the threaded end portion 154 has an anchor lock nut member 150 threaded thereon. This is an adjustable feature and an inner surface of the anchor nut member 150 is operable to engage the outer surface of the movable rod support assembly 158 when in the telescoped position as noted in FIG. 4. This limits telescoping movement of the chain support beam member 58.

The mud flap support assembly 42 includes 1) a forward flap assembly 124 connected to the chain support beam member 58; and 2) a rear flap assembly 127 which is connected to a box beam frame member 28 as noted in FIG. 1.

The forward flap assembly 124 includes a flap support plate 126 secured to a side wall 68 of the chain support beam member 58 and having a primary flap member 128 secured to the flap support plate 126.

The flap support plate 126 includes a rectangular plate member 130 which is welded along an anchor edge 132 to the side, wall 68. The rectangular plate member 130 has a plurality of spaced connector holes 134 to receive nut and bolt members 56 to support the primary flap member 128 thereon.

The primary flap member 128 can be constructed of a resilient rubber type material and extends substantially downwardly from the rectangular plate member 130. The primary flap member 128 operates to provide protection from swinging tire chains 15 on the chain support assembly 62 so that they will not contact and damage an adjacent fuel storage tank 27.

Additionally, the primary flap member 128 operates to prevent mud, water, and debris from a roadway covering the tire chains 15.

The rear flap assembly 127 includes 1) a flap support bracket 136 secured to respective ones of the parallel box beam frame members 28 of the tractor trailer combination 14; and 2) a flap support bar 139 secured to the flap support bracket 136 and having a secondary flap member 138 connected thereto.

The flap support bracket 136 is of generally "L" shape having a first leg section 140 integral with a second leg section 142, each having anchor holes 141 therein.

The flap support bar 139 has a plurality of spaced holes operable to receive nut and bolt members 56 therethrough to secure an upper edge of the secondary flap member 138 thereagainst. It is seen that this stationary flap member 138 is positioned adjacent but rearwardly of the chain support frame assembly 38 to provide protection in the transport condition from mud, water, and debris from adjacent tire members on rotating the wheel and axle assemblies 22 from placing mud, water, and debris on the conveyed chain members 15.

USE AND OPERATION OF THE INVENTION

In the use and operation of the invention, it is seen that a pair of substantially the identical tire chain hanger support assemblies 12 can be mounted on the outer upright walls 30 of the parallel box beam frame members 28 as noted in FIG. 2.

It is obvious that the respective support bracket assemblies 44 can be secured as by nut and bolt members 56 through the anchor holes 54 in the respective base support plate 48 to achieve the mounted condition of FIG. 2. In this condition, it is noted that the tire chains 15 can be mounted on the respective cooperating ones of the primary support members 74 and secondary support members 76 of the chain support assembly 62.

If the operator of the tractor trailer combination 14 finds a need to place the tire chains 15 about the tire members of the respective wheel and axle support assemblies 22, it is obvious that the operator would pull off road or into a rest area and stop movement of the tractor trailer combination 14.

The next step would be for the operator to actuate a lock pin assembly 98 and move same to the retracted position as noted in FIG. 6 and by an arrow 178 in FIG. 4. In this position, the anchor portion 118 is pulled from the respective alignment hole 119 in the support beam member 46. This would then allow the operator to grasp the handle member 96 and move the chain support beam member 58 towards an extended position as noted by an arrow 176 in FIG. 7.

With use of the support latch bar 121, it can be pivoted downwardly so as to be parallel to the body section 112 of the pin member 106 and contact an adjacent top wall 66 of the chain support beam member 58. This allows the operator to use his full attention and strength to move the chain support beam member 58 to the fully extended position as noted in FIG. 4.

This telescoping movement to the fully extended position places both of the chain support beam members 58 laterally of an upright side wall of the semi-trailer assembly 18 so the operator has ready access to the chain support assembly 62 to remove the tire chains 15 therefrom.

Next, after the tire chains 15 have been placed on the tire members of the wheel and axle assemblies 22, it is obvious that the operator can grasp the respective handle members 96 to move the chain support beam members 58 towards the retracted positions as shown in FIG. 7 and indicated by an arrow member 180 in FIG. 7.

After reaching the retracted position of FIG. 3, it is obvious that the operator need only move the support latch bar 121 into parallel relationship with the handle section 114 of the pin member 106. The pin member 106 will be moved by the compression spring 122 to the locked condition as noted in FIG. 6.

It is seen that the mud flap support assembly 42 is utilized with the forward flap assembly 124 connected to the chain support beam member 58 to protect the respective fuel storage tanks 27 and provide a shield to prevent mud and debris from coating the tire chains 15 when mounted on the chain support assembly 62.

The rear flap assembly 127 is stationary and positioned between the tire chain hanger support assembly 12 and the adjacent tire members on the wheel and axle assembly 22.

The secondary flap member 138 again acts as a shield to prevent mud and debris from being thrown on the tire chains 15 from adjacent, rearward ones of the tire members on a wheel and axle assembly 22.

In conditions where the tractor trailer combination 14 is used in warmer climates or the tire chains 15 are not to be used, it is noted that the telescoping control assembly 40 can be disconnected from the chain support frame assembly 38 so that it can be removed for storage. The removal of the chain support frame assembly 38 only requires the removal of the anchor nut member 150 on the outer threaded end portion 154 of the main rod member 148.

The positioning of the primary hook members 78, 80, 82 relative to respective ones of the hook members 94 allows for easy placement of the tire chains 15 on the respective primary hook members 78, 80 82 with the loose ends of the tire chains 15 placed on the hook members 94. This allows the operator to neatly place the tire chains 15 on the chain support assembly 62 to prevent tangling thereof during transporting and subsequent easy removal when needed.

It is seen that the tire chain hanger support assembly of this invention is easily mounted on the box beam frame members of a support frame assembly of the tractor trailer combination.

The tire chain hanger support assembly is of rigid construction; economical to manufacture; easily used by a single operator of the tractor trailer combination; and substantially maintenance free.

While the invention has been described in conjunction with preferred specific embodiments thereof, it will be understood that this description is intended to illustrate and not to limit the scope of the invention, which is defined by the following claims:

We claim:

1. A tire chain hanger support assembly mountable on a support frame assembly operable to support tire chains thereon, comprising:
   a) a main support frame assembly having an elongated support beam member;
   b) a chain support frame assembly including an elongated chain support beam member telescopingly mounted on said support beam member and a chain support assembly secured to said chain support beam member;
   c) a telescoping control assembly secured to said support beam member and operably connected to said chain support beam member to aid in and limit longitudinal telescoping movement of said chain support beam member relative to said support beam member and prevent disconnection from said support beam member; and
   d) a mud flap support assembly including a forward flap assembly having a flap support plate secured to a forward portion of said chain support beam member and having a primary flap member connected thereto extended downwardly therefrom;
   whereby said chain support beam member is telescopingly movable to an extended position relative to said support beam member to permit ready access to tire chains mounted or to be placed on said chain support beam member.

2. A tire chain hanger support assembly operable to be connected to a frame member on a support frame assembly on a vehicle such as a tractor cab on a tractor trailer combination in order to convey tire chains in a compact, orderly fashion, comprising:
   a) a main support frame assembly connected by a support bracket assembly to the frame member and having a support beam member secured to said support bracket assembly and extended laterally therefrom perpendicular to a longitudinal axis of the vehicle.
   b) a chain support frame assembly having a chain support beam member telescopingly mounted on said support beam member and selectively movable from a retracted position with one end adjacent said support bracket assembly to an extended position with said one end adjacent an outer end of said support beam member extended outwardly of an outer sidewall of the vehicle;

c) said chain support frame assembly includes a chain support assembly having support members to receive, support, and store the tire chains thereon; and d) a mud flap support assembly having a forward flap assembly with a flap support plate secured to a forward surface of said chain support beam member and having a primary flap member secured to said flap support plate and extended downwardly therefrom to provide a shield to prevent mud and other debris from hitting said chain support assembly and chain members supported thereon.

3. A tire chain hange support assembly as described in claim 12, wherein:

a) said mud flap support assembly includes a rear flap assembly having a flap support bracket secured to the support frame assembly on the vehicle and having a secondary flap member connected thereto; and b) said secondary flap member provides a shield adjacent but rearwardly of said chain support assembly to prevent mud and debris from being placed thereon by a rotating tire member and protect the tire chains mounted thereon.

4. A tire chain hanger support assembly mountable on a support frame assembly operable to support tire chains thereon, comprising:

a) a main support frame assembly having an elongated support beam member;

b) a chain support frame assembly including an elongated chain support beam member telescopingly mounted on said support beam member and a chain support assembly secured to said chain support beam member;

c) a mud flap support assembly including a forward flap assembly having a flap support plate secured to a forward portion of said chain support beam member and having a primary flap member connected thereto extended downwardly therefrom; and d) said mud flap support assembly includes a rear flap assembly connected to the support frame assembly and having a flap support bracket with a secondary flap member mounted thereon extended adjacent but rearwardly of said tire chain hanger support assembly to prevent mud and other debris from adjacent rotating tire members on a wheel and axle assembly on a vehicle from reaching said tire chain hanger support assembly and any tire chains mounted thereon;

whereby said chain support beam member is telescopingly movable to an extended position relative to said support beam member to permit ready access to tire chains mounted or to be placed on said chain support beam member; and whereby said primary flap member is operable to protect said chain support assembly and the tire chains mounted thereon from mud and debris during a road traveling operation.

5. A tire chain hanger support assembly operable to be connected to a frame member on a support frame assembly on a vehicle such as a tractor cab on a tractor trailer combination in order to convey tire chains in a compact, orderly fashion, comprising:

a) a main support frame assembly connected by a support bracket assembly to the frame member and having a support beam member secured to said support bracket assembly and extended laterally therefrom;

b) a chain support frame assembly having a chain support beam member telescopingly mounted on said support beam member and selectively movable from a retracted position with one end adjacent said support bracket assembly to an extended position with said one end adjacent an outer end of said support beam member; and c) said chain support frame assembly includes a chain support assembly having support members to receive, support, and store the tire chains thereon;

d) said chain support frame assembly including an actuator control assembly having a lock pin assembly with a pin member which is engagable with aligned holes in said support beam member and said chain support beam member in a locked position when said chain support beam member is in the retracted position on said support beam member so as to prevent unintentional longitudinal movement of said chain support beam member;

e) said lock pin assembly includes a bias member operable to bias said pin member to the engaged position locking said chain support beam member to said support beam member for safety purposes; and f) a telescoping control assembly secured to said support beam member and operably connected to said chain support beam member to aid in telescoping movement of said chain support beam member and limiting its outward movement in an extended position to prevent disconnection from said support beam member.

6. A tire chain hanger support assembly operable to be connected to a frame member on a support frame assembly on a vehicle such as a tractor cab on a tractor trailer combination in order to convey tire chains in a compact, orderly fashion, comprising:

a) a main support frame assembly connected by a support bracket assembly to the frame member and having a support beam member secured to said support bracket assembly and extended laterally therefrom perpendicular to a longitudinal axis of the vehicle;

b) a chain support frame assembly having a chain support beam member telescopingly mounted on said support beam member and selectively movable from a retracted position with one end adjacent said support bracket assembly to an extended position with said one end adjacent an outer end of said support beam member extended outwardly of an outer sidewall of the vehicle;

c) said chain support frame assembly includes a chain support assembly having support members to receive, support, and store the tire chains thereon; and d) a mud flap support assembly includes a rear flap assembly connected to the support frame assembly and having a flap support bracket with a secondary flap member mounted thereon extended adjacent but rearwardly of said tire chain hanger support assembly to prevent mud and other debris from adjacent rotating tire members on a wheel and axle assembly on a vehicle from reaching said tire chain hanger support assembly and any tire chains mounted thereon.

* * * * *